3,087,291
GAS SWEETENING PROCESS AND APPARATUS
Harry L. Jackson and Thomas E. Kraner, Houston, Tex., assignors to C-B Southern, Inc., Houston, Tex., a corporation
Filed June 22, 1960, Ser. No. 38,007
8 Claims. (Cl. 55—62)

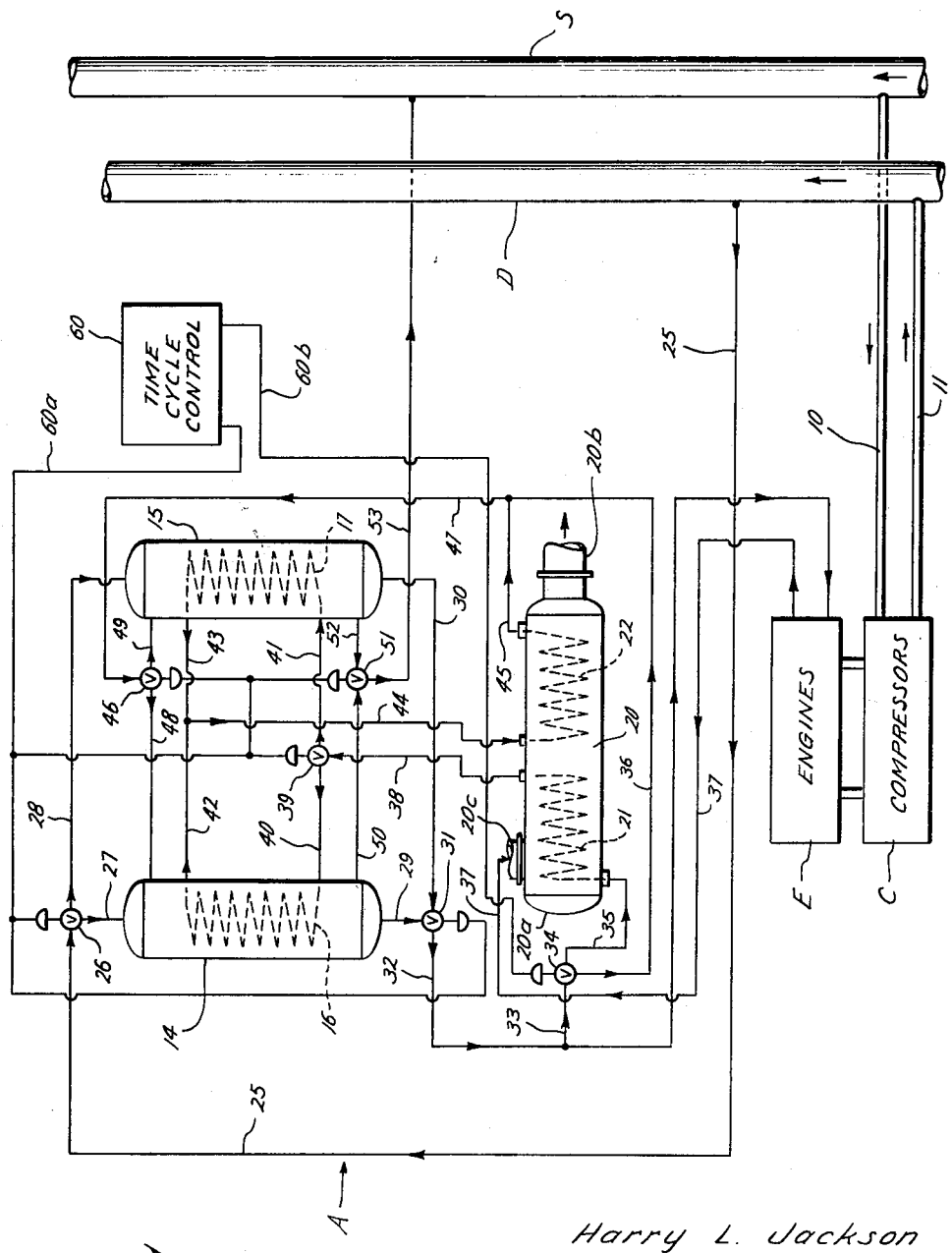

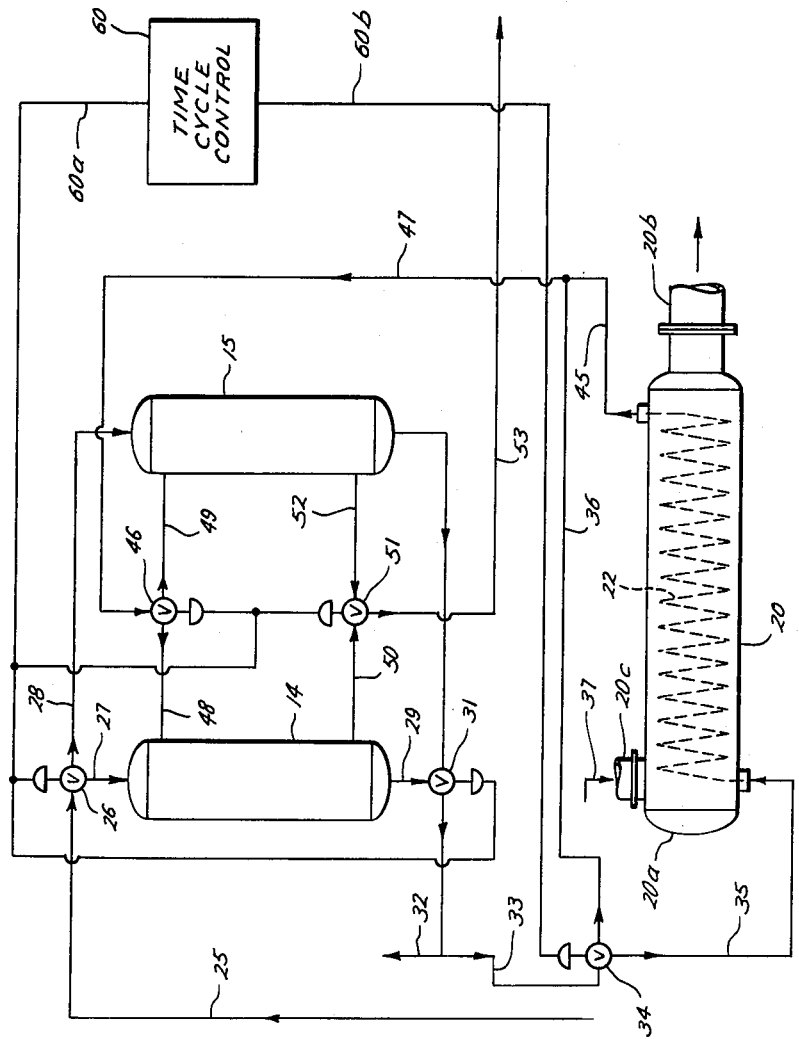

This invention relates to new and useful improvements in processes and apparatus for sweetening gases, and particularly processes and apparatus for removing hydrogen sulfide from hydrocarbon gas to render same suitable for fuel gas.

As is well known, hydrocarbon gas such as methane, ethane, propane, butane, pentane, and mixtures of one or more of such hydrocarbons, are transmitted across country through pipelines from the source of the gas to a plant for treatment or for distribution users. During such transmission, the gas is compressed at compressor stations located at intervals along the pipeline to maintain the gas pressures for the flow of the gas at the maximum rates. For convenience and economy, it is desirable to use some of the hydrocarbon gas from the pipeline as the fuel for the engines driving the compressors at such compressor stations. However, when the gas contains substantial amounts of hydrogen sulfide, the gas is "sour" and is so corrosive that it cannot be safely used as the fuel gas for the compressor engines.

It is therefore an object of this invention to provide a new and improved process and apparatus for removing hydrogen sulfide from hydrocarbon pipeline gas for thereby sweetening same to render the gas suitable for use as the fuel for compressor engines.

An important object of this invention is to provide a new and improved process and apparatus for sweetening fuel gas for compressor engines by removing hydrogen sulfide from the gas by adsorption, and wherein the adsorption bed used for the adsorption is regenerated by a regeneration gas which is heated by the exhaust gases from the compressor engines, whereby an economical regeneration is provided.

Another object of this invention is to provide a new and improved process and apparatus for sweetening hydrocarbon gas having hydrogen sulfide and carbon dioxide therewith by adsorbing the hydrogen sulfide from the gas without adsorbing the carbon dioxide whereby the capacity of the equipment for such adsorption is materially reduced as compared to equipment for adsorbing both hydrogen sulfide and carbon dioxide.

A particular object of this invention is to provide a new and improved process and apparatus for withdrawing a portion of hydrocarbon gas flowing in a pipeline from the discharge side of one or more compressors, for thereafter passing such withdrawn gas through an adsorption bed to remove hydrogen sulfide therefrom, for using the treated gas for the fuel in one or more compressor engines, for using the exhaust gas from the engines for heating the regeneration gas for the adsorption bed, and for then discharging the regeneration gas into a pipeline connected to the suction side of the compressors.

Still another object of this invention is to provide a new and improved process and apparatus for treating sour gas to sweeten same prior to use as a fuel gas, wherein a portion of the sweetened gas from one adsorption bed is initially heated and is used for supplying heat to another adsorption bed which is on a regeneration cycle while a heated regeneration gas is passed through such adsorption bed, whereby twice as much heat is imparted to the bed on regeneration with the same volume of regeneration gas.

A still further object of this invention is to provide a new and improved process and apparatus for treating sour hydrocarbon gas to remove hydrogen sulfide therefrom, wherein each of the adsorption beds is provided with a heating coil through which heated gas flows during the regeneration of each bed, and wherein each heating coil is positioned near the outer area of each bed to uniformly distribute heat to each bed during the regeneration thereof, whereby a more complete regeneration of the beds is obtained.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is a schematic flow diagram of the process and apparatus of this invention in the preferred form; and, FIG. 2 is a schematic view of a modified form of the adsorption bed system which may be used with the process and apparatus of this invention.

In the drawings, the letter A designates generally the preferred form of the adsorption bed system of this invention which is connected with the suction line S and the discharge line D of a pipe line for sweetening gas such as hydrocarbon gas having hydrogen sulfide therewith to remove the hydrogen sulfide therefrom, as will be more fully explained. In the apparatus of this invention, and in carrying out the method of this invention, the adsorption bed system A operates in conjunction with one or more compressor engines E which operate one or more compressors C in the known manner. As will be more fully explained, the sweetened gas from the adsorption bed system A is used for the fuel in the engine or engines E and the hot exhaust gases from the engine or engines E are used to heat the regeneration gas in the adsorption bed system A.

Considering the invention more in detail, it should first be noted that the suction line S and the discharge line D are typical lines forming a part of a pipe line for transmitting hydrocarbon gas. As previously pointed out, compressor stations are utilized along pipe lines to maintain a desired pressure for the gas flowing in the pipe line. When the gas is being transmitted through the pipe line for relatively long distances, the compressor stations are located at intervals to keep the pressure of the gas at the desired level. This invention relates to a process and apparatus capable of being used at any one of such compressor installations where the gas flowing in the pipe line has hydrogen sulfide therein. It will be understood that the pressure in the suction line is lower than the pressure in the discharge line since the hydrocarbon gas flowing in the suction line is transferred to the compressor or compressors through a suitable flow line 10 and is then discharged from the compressor or compressors C through a line 11 connected to the discharge line D. In that manner, the pressure of the gas flowing in the pipe line is increased at each compressor installation along the pipe line.

The adsorption bed system A shown in FIG. 1 includes a pair of adsorption beds 14 and 15, each of which contains a suitable adsorbent therein. Various types of adsorbents are known, but preferably, in carrying out the method of this invention, the adsorbent is a material known as a molecular sieve sold by Linde Company. However, it is possible that other adsorbents such as silica gel may be used. Coils 16 and 17 are located within the adsorption bed tanks 14 and 15, respectively, for a purpose to be hereinafter described. The coil 16 is helically or spirally formed within the bed 14 and is disposed near the outer periphery of the bed 14. The coil 17 is similarly constructed and positioned within the bed 15.

For the purpose of heating a regeneration gas for regenerating one of the adsorption beds 14 and 15 at a time, a heat exchanger 20 is provided which has an initial heating coil or element 21 therein and also a second heating coil or element 22 therein.

The discharge line D of the pipe line is connected to the adsorption bed system A by means of a flow line 25 which extends from the discharge line D to a valve 26. Such valve 26 has outlet lines 27 and 28 connected thereto. Such valve 26 is therefore a three-way conventional valve suitable for directing the gas from the line 25 through either of the lines 27 or 28, depending upon the position of the valve 26 as will be more fully explained. When the valve 26 is open to permit flow through the line 27 while stopping flow through the line 28, the incoming sour hydrocarbon gas from the line 25 flows through the valve 26, the line 27 and into the adsorption bed or tank 14. The adsorbent material such as the molecular sieve within the bed 14 removes the hydrogen sulfide preferentially from the gas and the sweetened gas is discharged from the bed 14 through flow line 29. If the bed 14 is thus being used for the adsorption of the hydrogen sulfide from the gas, the other bed 15 is being regenerated as will be more fully explained. When the bed 14 is being regenerated, the bed 15 is being used for adsorbing the hydrogen sulfide from the incoming gas. Therefore, when the bed 15 is on the adsorption cycle, the valve 26 is positioned so that the flow through the line 27 is stopped and the flow through the line 28 is permitted. The incoming gas thus flows through the line 28 and the adsorption bed 15 for discharge as a sweetened gas through a discharge line 30.

The lines 29 and 30 connect with a conventional three-way valve 31 which has an outlet line 32 connected therewith. The valve 31 is positioned so that the line 29 is open for establishing fluid communication through the valve 31 to the line 32 when the bed 14 is on the adsorption cycle. However, when the bed 15 is on the adsorption cycle, the valve 31 is positioned so that the flow line 30 is in communication with the line 32.

The line 32 connects with the engine or engines E and directs such gas which has been sweetened by the removal of the hydrogen sulfide therefrom to such engine or engines E for use as a fuel gas for such engine or engines E. A portion of the sweetened gas in the line 32 is caused to flow through another flow line 33 connected to the line 32. The line 33 has a three-way valve 34 connected thereto which is connected to discharge lines 35 and 36. The valve 34 is normally set for permitting flow from the line 33 to the line 35, but during the initial starting of the system, the valve 34 may be set to permit flow from the line 33 to the line 36. The line 35 is connected with the coil or flow element 21 within the heat exchanger 20. As shown, the heat exchanger 20 is in the form of a vessel or cylindrical tank which is closed at one end as indicated at 20a and which is open at the other end as indicated at 20b, or is otherwise suitably arranged for the flow of gases in heat exchange relationship, as will be explained. Thus, the sweetened gas which passes through the coil 21 which is disposed within the vessel 20 flows outwardly therefrom after being heated by a gas introduced into the vessel 20 externally of the coil 21. The exhaust gas from the engine or engines E is transmitted to the heat exchanger vessel 20 for the furnishing of the heat to the coil 21 by flowing such exhaust gas through line 37 from the engines E to the inlet 20c to the interior of the vessel 20.

The sweetened gas which is thus initially heated in the coil 21 flows through a flow line or pipe 38 to a three-way valve 39 which is connected with flow lines or pipes 40 and 41. The flow line 40 connects with the coil 16 within the adsorption bed or tank 14, whereas the flow line or pipe 41 connects with the coil 17 which is within the adsorption bed or tank 15. Therefore, when the adsorption bed 14 is on the adsorption cycle and the adsorption bed 15 is on the regeneration cycle, the valve 39 is set for preventing flow through the line 40 and for permitting flow through the line 41 to thereby transmit heat from the gas to the bed as the gas flows through the coil 17 from the line 41. As previously explained, both of the coils 16 and 17 are positioned so that they are near the outer periphery or area of the beds 14 and 15, respectively, and therefore, when the heated gas flows through the coil 17, the outer area of the bed 15 is heated. This is important because during normal procedures heretofore utilized, the outer areas of the adsorption beds have not been adequately or uniformly heated during regeneration. The central portion of the bed 15 is heated by the regeneration gas flowing therethrough as will be explained but such heat is not normally distributed to the outer portion of the bed in the previous apparatus and prior known methods.

The upper end of the coil 16 is connected to a flow line 42 for discharging the heated gas from the coil 16 to a flow line 44 when the coil 16 is used during the regeneration cycle. Similarly, the coil 17 is connected with a flow line 43 and the line 44. Thus, when the bed 15 is on the regeneration cycle, as previously explained, the gas will be discharged from the coil 17 through line 43 and line 44 to flow through the coil 22 which is disposed within the heat exchanger vessel 20. The sweetened gas which thus was used for the heating of the bed on regeneration by flowing through the coil 17, assuming the bed 15 to be on the regeneration cycle, is again heated by the exhaust gases flowing through the heat exchanger 20 so that a double heat is imparted to the same volume of gas flowing through the coils 21 and 22. The sweetened gas flows from the coil 22 through the line or pipe 45 for flowing to a three-way valve 46 through a flow line 47 extending from the line 45 to the valve 46. The valve 46 may be of any conventional construction and is adapted to be moved or positioned so that the flow from the line 47 through the valve 46 may be to either a line 48 connected with the regeneration bed 14 or a line 49 connected to the regeneration bed 15. Assuming, as before, that the bed 14 is on the adsorption cycle and the bed 15 is on the regeneration cycle, then the valve 46 is so positioned that flow through the line 48 is prevented and flow through the line 49 is permitted. It is to be noted that the gas flows through the adsorption bed 15 in direct contact with the adsorption material such as the molecular sieve material within the bed 15, whereas the heat from the coil 17 is obtained from the same gas but without contacting the material of the adsorption bed. The regeneration gas from the line 49 which flows through the bed 15 serves to heat the bed sufficiently to extract therefrom the hydrogen sulfide which has been previously adsorbed on the prior adsorption cycle wherein such hydrogen sulfide was adsorbed by the adsorbent in the bed 15. Therefore, the adsorbent in the bed 15 is stripped of the hydrogen sulfide by the hot sweetened regeneration gas, and as previously pointed out, the heat provided by the coil 17 increases the uniformity of such extraction or stripping and also increases the completeness of such extraction or stripping of the hydrogen sulfide from the adsorbent. The regeneration of the bed is also accomplished with a smaller volume of the regeneration gas due to the double heating of the regeneration gas. It will be understood that the regeneration of the adsorbent occurs in the bed 14 when the bed 14 is on the regeneration cycle in the same manner as explained above in connection with the regeneration of the adsorbent in the bed 15.

The bed 14 has a regeneration gas discharge line 50 extending therefrom to a three-way valve 51, and the bed 15 has a discharge regeneration line 52 extending therefrom to the valve 51. When the bed 15 is on the regeneration cycle, the valve 51 is positioned to permit flow from the line 52 through the line 51 to a pipe or flow line 53 which extends to the suction line S of the pipe line. When the bed 14 is on the regeneration cycle, the valve 51 is positioned for flow from the line 50 to the line 53.

As previously pointed out, the heat is supplied to the heat exchanger 20 by the exhaust gases from the engine or engines E which is transmitted to the heat exchanger vessel 20 through a pipe or flow line 37. The exhaust gases are discharged from the vessel 20 through the discharge line 20b or any other suitable opening after having passed over the heating coils or elements 21 and 22 within the vessel 20.

The various valves previously identified in the system disclosed in FIG. 1 may be manually controlled, but preferably they are controlled by a time cycle control 60 which is schematically illustrated as having connections 60a and 60b extending therefrom to the valves. Thus, the control line 60a extends to the valves 31, 39, 46 and 51. The control line 60b extends to the valve 34. Other forms of controls may also be utilized as will be understood by those skilled in the art.

Considering now the process of this invention and the use of the apparatus of this invention, the process will first be described with the bed 14 on the adsorption cycle and the bed 15 on the regeneration cycle. The incoming gas flowing from the discharge line D of the pipe line flows through the line 25 to the valve 26. The valve 26 is positioned for permitting flow through the line 27 and then through the adsorption bed 14 for discharge as sweetened gas through the line 29. The hydrogen sulfide is removed by the adsorbent in the bed 14 as previously described. The valve 31 is positioned to permit flow from the line 29 to the line 32 and then a portion of the sweetened gas from the line 32 is directed through the line 33 and the valve 34 while the remainder of the sweetened gas flows to the engine or engines E to serve as the fuel gas for such engine or engines E. The exhaust gas from the engine or engines E flows from line 37 through the heat exchanger vessel 20 as previously described while the engines E are operating. The valve 34 is initially set during the first part of the regeneration cycle so that flow is permitted from the line 33 to the line 35 while preventing flow through the line 36. The sweetened gas is thus heated in the coil 21 and flows through the valve 39 to the line 41 and then through the coil 17 for discharge therefrom to the line 43 for circulation through the coil 22 for the second heating of the sweetened gas prior to flowing through the bed 15 for regeneration. The gas flows from the coil 22 through the line 47 to the valve 46 which is positioned for flow through the line 49 to the bed 15. As previously pointed out, the bed 15 has hydrogen sulfide present therein from a previous adsorption cycle and such hydrogen sulfide is removed from the bed 15 due to the high temperature of the gas flowing through the bed. By way of example, the regeneration gas would be at a temperature between 450° F. and 500° F. when the adsorbent is the molecular sieve material previously referred to. Such temperature can be obtained with the exhaust gases from the engines E since they are normally at about 600° F.

The regeneration gas with the hydrogen sulfide therein is then discharged through line 52 from the bed 15 and is permitted to flow through the valve 51 to the line 53 for discharge into the suction line S. If it is desirable to prevent the hydrogen sulfide from passing with the gas to the compressor or compressors C, the line 53 may be flared or otherwise disposed of rather than discharging same into the suction line S.

Normally, due to the heat of the gases flowing through the bed 15, it is desirable to cool the bed on the regeneration cycle prior to switching same to the adsorption cycle. For that reason, the time cycle control 60 is adjusted so that the valve 34 is switched at an intermediate point during the regeneration cycle of the bed 15 to change the valve 34 so that the sweetened gas from the line 33 flows to the line 36 and is prevented from flowing to the line 35. In that way, the gas flowing in the line 36 is cool sweetened gas and it is connected with the line 47 for flowing directly through the regeneration bed. A certain amount of removal of the hydrogen sulfide still continues even though the gas is cool due to the fact that the bed is still hot from the previous heat of the hot regeneration gases, but the bed is gradually cooled until it reaches a satisfactory point for subsequent adsorption.

While the bed 15 is thus on the preliminary hot regeneration cycle and then the cooling phase, the bed 14 is still on the adsorption cycle, but when the bed 15 has been cooled adequately, then the time cycle control 60 is actuated to switch the valves 26, 29, 39, 49 and 51. Also, the valve 34 is returned to the position for the flow of the gas from line 33 to line 35 rather than line 36 so that there will be the same preliminary heating and regeneration of the bed 14 followed by the cooling thereof. Thus, the valve 26 is positioned so that the incoming sour hydrocarbon gas from the line 25 flows to the line 28 and then to the bed 15 for discharge through the line 30 and the valve 31 to the line 32. The regeneration gas is thus obtained from the line 33 and it initially flows through the line 35, the coil 21 and the line 40 to the coil 16. The hot regeneration gas is heated a second time by flowing through the line 42 to the line 44 and the coil 22 where the second heat is obtained. The reheated regeneration gas is then discharged through the line 45 to the line 47 for flow to the valve 46 and the line 48 to the bed 14 for the regeneration of the bed 14. The regeneration gas with the adsorbed hydrogen sulfide therewith is discharged through the line 50 and the valve 51 to the line 53 for return to the suction line S or for discharge at atmosphere or flaring. As previously pointed out, the valve 34 would be again rotated or changed in its position at an intermediate point during the regeneration of the bed 14 so that the flow would be through the line 36 rather than the line 35 and therefore the bed 14 would be cooled prior to the next adsorption phase.

The beds 14 and 15 are thus switched back and forth and are alternately on the adsorption and the regeneration cycles.

In the form of the invention shown in FIG. 2, the apparatus and the process have been simplified as compared to the apparatus and process of FIG. 1 in that the coils 16, 17 and 21 of FIG. 1 are not included in the process and apparatus of FIG. 2. Therefore, the double heat feature and the particular type of heating apparatus disclosed in FIG. 1 are not incorporated within the method and apparatus of FIG. 2. The various other parts which correspond in the two figures with each other bear the same numerals and function in substantially the same way. It will be understood that the line 25 connects with a discharge line such as the discharge D of FIG. 1 and the line 53 connects with a suction line such as the suction line S of FIG. 1. Also, the heating gas is the exhaust gas from the engine or engines in FIG. 1 which is introduced through the line 37 shown in FIG. 2. Likewise, the line 32 flows to the engines E for serving as fuel gas for such engine or engines.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A process for sweetening fuel gas for a compressor engine, comprising the steps of, directing the fuel gas through an adsorption bed to preferentially remove hydrogen sulfide from the gas, then utilizing the sweetened gas as fuel for a compressor engine, and thereafter heating a regenerating gas with exhaust gas from the compressor engine for regenerating the adsorption bed.

2. A process for sweetening hydrocarbon gas flowing in a pipeline by removing hydrogen sulfide therefrom, comprising the steps of, flowing the gas to the suction side of a compressor from the pipeline and discharging the gas into the pipeline at a higher pressure from the discharge side of the compressor, withdrawing a portion of the gas discharged from the compressor, sweetening the withdrawn gas by removing hydrogen sulfide therefrom, and then using the sweetened gas as the fuel for an engine driving the compressor.

3. A process for sweetening fuel gas for a compressor engine, comprising the steps of, directing the fuel gas through an adsorption bed to preferentially remove hydrogen sulfide from the gas, then utilizing the sweetened gas as fuel for a compressor engine, and also as a regeneration gas for the adsorption bed, and thereafter heating the regeneration gas with exhaust gas from the compressor engine.

4. A process for sweetening hydrocarbon gas flowing in a pipeline by removing hydrogen sulfide therefrom, comprising the steps of, flowing the gas to the suction side of a compressor from the pipeline and discharging the gas into the pipeline at a higher pressure from the discharge side of the compressor, withdrawing a portion of the gas discharged from the compressor, directing the withdrawn gas through an adsorption bed to preferentially remove hydrogen sulfide therefrom for sweetening same, utilizing the sweetened gas as fuel for a compressor engine and also a regeneration gas for the adsorption bed, and thereafter heating the regeneration gas with exhaust gas from the compressor engine.

5. A process for sweetening gas, comprising the steps of, directing the gas through an adsorption bed to preferentially remove hydrogen sulfide from the gas to thereby sweeten same while regenerating another adsorption bed which was previously used for adsorbing hydrogen sulfide, flowing the sweetened gas to a compressor engine for fuel and also to the adsorption bed being regenerated to serve as the regeneration gas, and flowing the exhaust gas from the engine in heat exchange relationship with the regeneration gas for the adsorption bed being regenerated.

6. An apparatus for sweetening fuel gas, comprising a compressor engine, a compressor operably connected to said engine for compressing a gas, an adsorption bed system for removing hydrogen sulfide from gas including a pair of adsorption beds one of which is used for removing hydrogen sulfide from the gas while the other is being regenerated, means for directing gas from the discharge side of the compressor to the adsorption bed being used for removing hydrogen sulfide from the gas, means for directing sweetened gas from the adsorption bed system to the engine for fuel for operating the engine and for serving as a regeneration gas for the adsorption bed being regenerated, and means for flowing the exhaust gas from the engine to the adsorption bed system for heating the regeneration gas used to regenerate the bed being regenerated.

7. An apparatus for sweetening fuel gas, comprising a compressor engine, a compressor operably connected to said engine for compressing a gas, an adsorption bed system for removing hydrogen sulfide from gas including a pair of adsorption beds one of which is used for removing hydrogen sulfide from the gas while the other is being regenerated, means for directing gas from the discharge side of the compressor to the adsorption bed being used for removing hydrogen sulfide from the gas, means for directing the gas from the adsorption bed system to the engine for fuel for operating the engine, means for flowing the exhaust gas from the engine to the adsorption bed system to heat the regeneration gas therefor, and means for switching the adsorption bed on the adsorption cycle to the regeneration cycle and for switching the bed on regeneration to the adsorption cycle.

8. An apparatus for sweetening fuel gas, comprising a compressor engine, a compressor operably connected to said for compressing a gas, an adsorption bed system for removing hydrogen sulfide from gas including a pair of adsorption beds one of which is used for removing hydrogen sulfide from the gas while the other is being regenerated, means for directing gas from the discharge side of the compressor to the adsorption bed being used for removing hydrogen sulfide from the gas, means for heating a portion of the sweetened gas a first time, means for directing sweetened gas from the adsorption bed system to the engine for fuel for operating the engine, means for circulating the heated gas through the adsorption bed being regenerated, means for heating the sweetened gas which has been circulated through the adsorption bed to thereby heat such gas a second time, means for flowing the sweetened gas which has been heated a second time through the bed being regenerated to thereby impart a double heat for bed regeneration with each volume of the sweetened gas used for regeneration, and means for directing the exhaust gas from the engine to said means for heating the gas the first time and to said means for heating the gas for the second time whereby the exhaust gas from the engine serves as the heating medium for the regeneration gas.

References Cited in the file of this patent

UNITED STATES PATENTS

| | | |
|---|---|---|
| 1,717,103 | Godol | June 11, 1929 |
| 2,083,732 | Moore et al. | June 15, 1937 |
| 2,241,717 | Robinson et al. | May 13, 1941 |
| 2,535,902 | Dailey | Dec. 26, 1950 |
| 2,698,055 | Williams | Dec. 28, 1954 |
| 2,815,089 | Turner | Dec. 3, 1957 |
| 2,861,651 | Miller | Nov. 25, 1958 |
| 3,024,868 | Milton | Mar. 13, 1962 |